(12) United States Patent
Sawada

(10) Patent No.: US 6,414,652 B1
(45) Date of Patent: Jul. 2, 2002

(54) COLOR IMAGE READER

(75) Inventor: Hideki Sawada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/355,378

(22) PCT Filed: Dec. 18, 1998

(86) PCT No.: PCT/JP98/05760

§ 371 (c)(1),
(2), (4) Date: Jul. 26, 1999

(87) PCT Pub. No.: WO99/33256

PCT Pub. Date: Jul. 1, 1999

(30) Foreign Application Priority Data

Dec. 19, 1997 (JP) .............................................. 9-350418

(51) Int. Cl.⁷ ................................................. G09G 3/14
(52) U.S. Cl. ............................. 345/46; 355/67; 355/69; 358/475
(58) Field of Search .......................................... 345/46

(56) References Cited

U.S. PATENT DOCUMENTS

| | | | | |
|---|---|---|---|---|
| 4,978,952 A | * | 12/1990 | Irwin ........................... | 345/102 |
| 5,744,795 A | * | 4/1998 | Bianchi et al. .............. | 250/234 |
| 5,753,906 A | * | 5/1998 | Gennetten ................... | 250/226 |
| 6,036,298 A | * | 3/2000 | Walker ........................ | 347/19 |
| 6,249,615 B1 | * | 1/2001 | Kunishige ................... | 382/274 |

FOREIGN PATENT DOCUMENTS

| | | | | |
|---|---|---|---|---|
| JP | 61-9075 | | 1/1986 | |
| JP | 4-368055 | | 12/1992 | |
| JP | 10-42100 A | * | 2/1998 | ............ H04N/1/04 |
| JP | 10-112805 | | 4/1998 | |
| JP | 10-126575 | | 5/1998 | |
| JP | 10-210218 | * | 8/1998 | ............ H04N/1/04 |

OTHER PUBLICATIONS

Mar. 30, 1999, International Search Report for PCT/JP98/005760.

* cited by examiner

Primary Examiner—Steven Saras
Assistant Examiner—William C. Spencer
(74) Attorney, Agent, or Firm—Merchant & Gould P.C.

(57) ABSTRACT

In a color image reading apparatus of the present invention, a first light output controller 23 controls, in full-color reading, a variable current regulating circuit 7 according to first reference data from a first storage device 25 in synchronism with a first lighting controller 21 for setting the light output of each light emitting diode to a first predetermined level. Further, a second light output controller 24 controls, in monochrome reading, the variable current regulating circuit 7 according to second reference data from a second storage device 26 for setting the light output of a green light emitting diode, which is turned on continuously by a second lighting controller 22, to a second predetermined level less than the first predetermined level.

8 Claims, 3 Drawing Sheets

COLOR IMAGE READER

FIELD OF THE INVENTION

The present invention relates to a color image reading apparatus employing, as reading light sources, light emitting diodes in three colors, respectively.

BACKGROUND OF THE INVENTION

A prior art color image reading apparatus employing, as reading light sources, light emitting diodes in three colors has such a design as shown in FIG. 4. Specifically, the respective anodes of a red, a green and a blue light emitting diodes 31R, 31G, 31B are commonly connected to a 5-volt DC power source for example. The cathode of each light emitting diode 31R, 31G, 31B is connected to one end of a respective resistor 32R, 32G, 32B. The other end of each resistor 32R, 32G, 32B is connected to a respective analog switch 33R, 33G, 33B. The other end of each analog switch 33R, 33G, 33B is commonly grounded.

Each light emitting diode 31R, 31G, 31B is controlled individually by adjusting the on-period of the respective analog switch 33R, 33G, 33B, such that the amount of light emitted from the respective light emitting diode has a predetermined value.

The light emitting diodes 31R, 31G, 31B differ largely from product to product with respect to the correlation between the current and the light output. Therefore, the light output of each diode has to be controlled by adjusting the on-period depending on the light output or by regulating the current depending on the on-period in order to obtain a predetermined amount of light emission. In the color image reading apparatus described above, the on-period is adjusted depending on the light output. Such adjustment is performed before shipment of the color image reading apparatus from the factory.

However, due to product variations, some light emitting diodes may have an extremely low light output. A color image reading apparatus employing such a light emitting diode necessitates a sufficiently long on-period, consequently giving rise to problems in realizing high-speed reading. Further, a difference in on-period between the red, green and blue colors results in a difference in moving distance, during the on-period, of an object being scanned in the secondary scanning direction, whereby the color reading quality may be adversely affected.

Moreover, since the prior art apparatus is incapable of reducing the current for monochrome reading, the life of e.g. the green light emitting diode 31G turned on for monochrome reading may be shortened.

For clarity improvement in monochrome reading, only the green light emitting diode 31G is turned on instead of simultaneously turning the light emitting diodes 31R, 31G, 31B for the three colors. In this case, since the green light emitting diode 31G, which is also used for full-color reading, is driven for monochrome reading with the same large current as used for full-color reading, the life of the green light emitting diode 31G may be shortened.

More specifically, due to differences in focal distance resulting from the different wavelengths of the three colors, the focal distance of the lens, which is used for focusing light reflected from the object surface at the light receiving surface of respective photoelectric elements, is normally adjusted with respect to the green light which has an intermediate wavelength among the red, green and blue light. Therefore, if the red, green and blue light emitting diodes 31R, 31G, 31B are turned on together for monochrome reading, the red light and the blue light are not focused accurately at the light receiving surface due to the focal distance differences between the three colors, thereby causing the image profile to be unclear. This is why the green light emitting diode 31G alone is turned on for monochrome reading.

SUMMARY OF THE INVENTION

It is therefore an object of the present invention to provide a color image reading apparatus which is capable of providing high-speed reading regardless of output fluctuations between different light emitting diodes while also prolonging the life of a light emitting diode which is used for monochrome reading.

According to a first aspect of the present invention, there is provided a color image reading apparatus comprising: a first lighting controller which, in full-color reading, successively turns on a red light emitting diode, a green light emitting diode and a blue light emitting diode as reading light sources each for a predetermined period; a first light output controller for setting light output of each light emitting diode, which is turned on by the first lighting controller, to a first predetermined level in full-color reading; a second lighting controller for continuously turning on one of the light emitting diodes in monochrome reading; and a second light output controller for setting, in monochrome reading, light output of said one light emitting diode, which is turned on continuously by the second lighting controller, to a second predetermined level less than the first predetermined level.

One or more light emitting diodes may be provided for each color.

The first predetermined level may be different or equal for each color.

The first lighting controller, the first light output controller, the second lighting controller and the second light output controller may be provided by a CPU (central processing unit) operating on predetermined programs.

The green light emitting diode may be turned on continuously at the time of monochrome reading. However, such is not limitative.

In a preferred embodiment, the second lighting controller turns on the green light emitting diode, and the second light output controller sets the light output of the green light emitting diode to the second predetermined level.

In another preferred embodiment, a single light emitting diode is provided for each color.

According to a second aspect of the present invention, there is provided a color image reading apparatus comprising: red, green and blue light emitting diodes provided, in any number for each other, as reading light sources; a variable current regulating circuit for supplying current to the light emitting diodes; a switch circuit for turning on and off each light emitting diode; a first lighting controller which controls the switch circuit for turning on the light emitting diodes, successively with respect to the colors, for a predetermined period in full-color reading; a first light output controller which, in full-color reading, controls the variable current regulating circuit in synchronism with the first lighting controller according to first reference data stored beforehand in a first storage device for setting the light output of each light emitting diode to a first predetermined level; a second lighting controller which controls the switch circuit for continuously turning on a selected color of the light emitting diodes in monochrome reading; a second light output controller which, in monochrome reading, controls the variable current regulating circuit according to second reference data stored beforehand in a second storage device for setting the light output of the selected light emitting diode, which is continuously turned on by the second lighting controller, to a second predetermined level less than the first predetermined level.

The switch circuit may comprise analog switches, but such is not limitative.

Each of the first and second storage device may comprise an EEPROM (electrically erasable and programmable read only memory) for example. However, a flash memory or a RAM (random access memory) backed up by a rechargeable battery may also be used. The first and second storage devices may be incorporated on a common semiconductor chip or separately on different semiconductor chips.

In a preferred embodiment, the switch circuit comprises an analog switch.

In another preferred embodiment, the first storage device comprises an electrically erasable non-volatile memory.

In another preferred embodiment, the second storage device comprises an electrically erasable non-volatile memory.

In another preferred embodiment, the first and second storage devices are incorporated on a single semiconductor chip which provides an electrically erasable non-volatile memory.

Other features and advantages of the present invention will be become apparent from the detailed description given below with reference to the accompanied drawings.

DETAILED DESCRIPTION OF THE PREFERRED EMBODIMENT

The preferred embodiment of the present invention will be specifically described below with reference to FIGS. 1 through 3.

Figure 1:
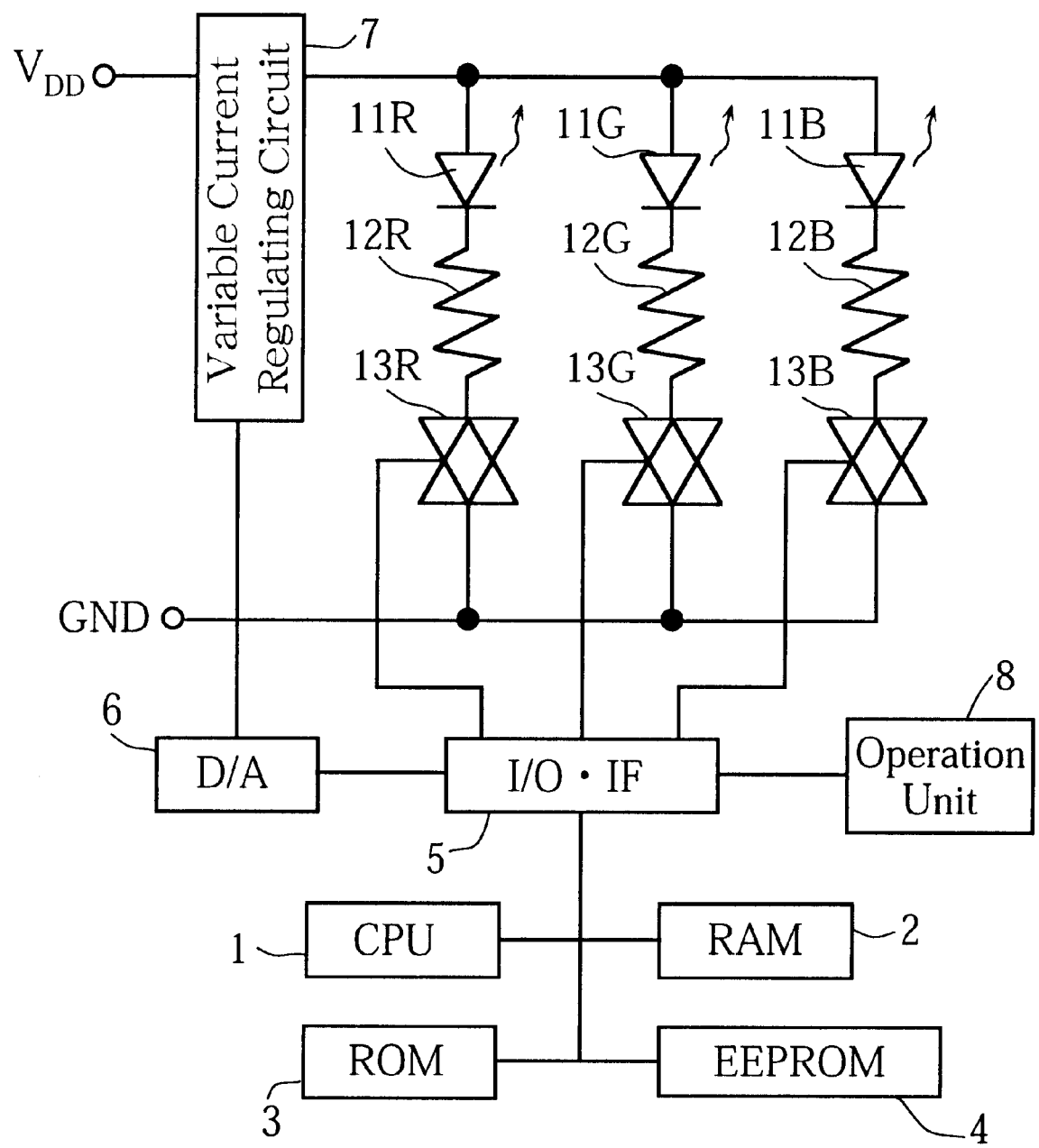
FIG. 1 is a circuit block diagram showing a principal portion of a color image reading apparatus embodying the present invention.

FIG. 1 is a circuit block diagram showing a principal portion of a color image reading apparatus embodying the present invention. This color image reading apparatus comprises a CPU 1, a RAM 2, a ROM 3, an EEPROM 4, an input/output interface 5, a digital-to-analog converter 6, a variable current regulating circuit 7, an operation unit 8, a red light emitting diode 11R, a green light emitting diode 11G, a blue light emitting diode 11B, resistors 12R, 12G, 12B, and analog switches 13R, 13G, 13B.

The CPU 1, RAM 2, ROM 3, EEPROM 4 and the input/output interface 5 are connected to each other through bus lines. The input/output interface 5 is connected to the D/A converter 6, the operation unit 8 and the control terminal of each analog switch 13R, 13G, 13B. The D/A converter 6 is connected to the control terminal of the variable current regulating circuit 7. The input terminal of the current regulating circuit 7 is connected to a 12-volt DC power source for example. The output terminal of the variable current regulating circuit 7 is connected to the anode of each light emitting diode 11R, 11G, 11B. The cathode of each light emitting diode 11R, 11G, 11B is connected to one end of a respective resistor 12R, 12G, 12B. The other end of each resistor 12R, 12G, 12B is connected to a respective analog switch 13R, 13G, 13B which is grounded at the other end.

The CPU 1 provides overall control of the color image reading apparatus.

The RAM 2 provides the CPU 1 with a work field and stores a variety of data.

The ROM (read only memory) 3 stores programs for operating the CPU 1.

The EEPROM 4 stores a variety of registration data and the like.

The input/output interface 5 controls the input and output of various data.

The D/A 6 receives reference data from the CPU 1 through the input/output interface 5 for conversion to analog reference voltage.

The variable current regulating circuit 7 outputs current in accordance with the reference voltage converted by the D/A converter 6.

The operation unit 8 has a plurality of key switches and outputs operation signals in accordance with the operation of an operator.

The light emitting diodes 11R, 11G, 11B irradiate a document with light for reading.

The analog switches 13R, 13G, 13B turn on and off the light emitting diodes 11R, 11B, 11G.

Figure 2:
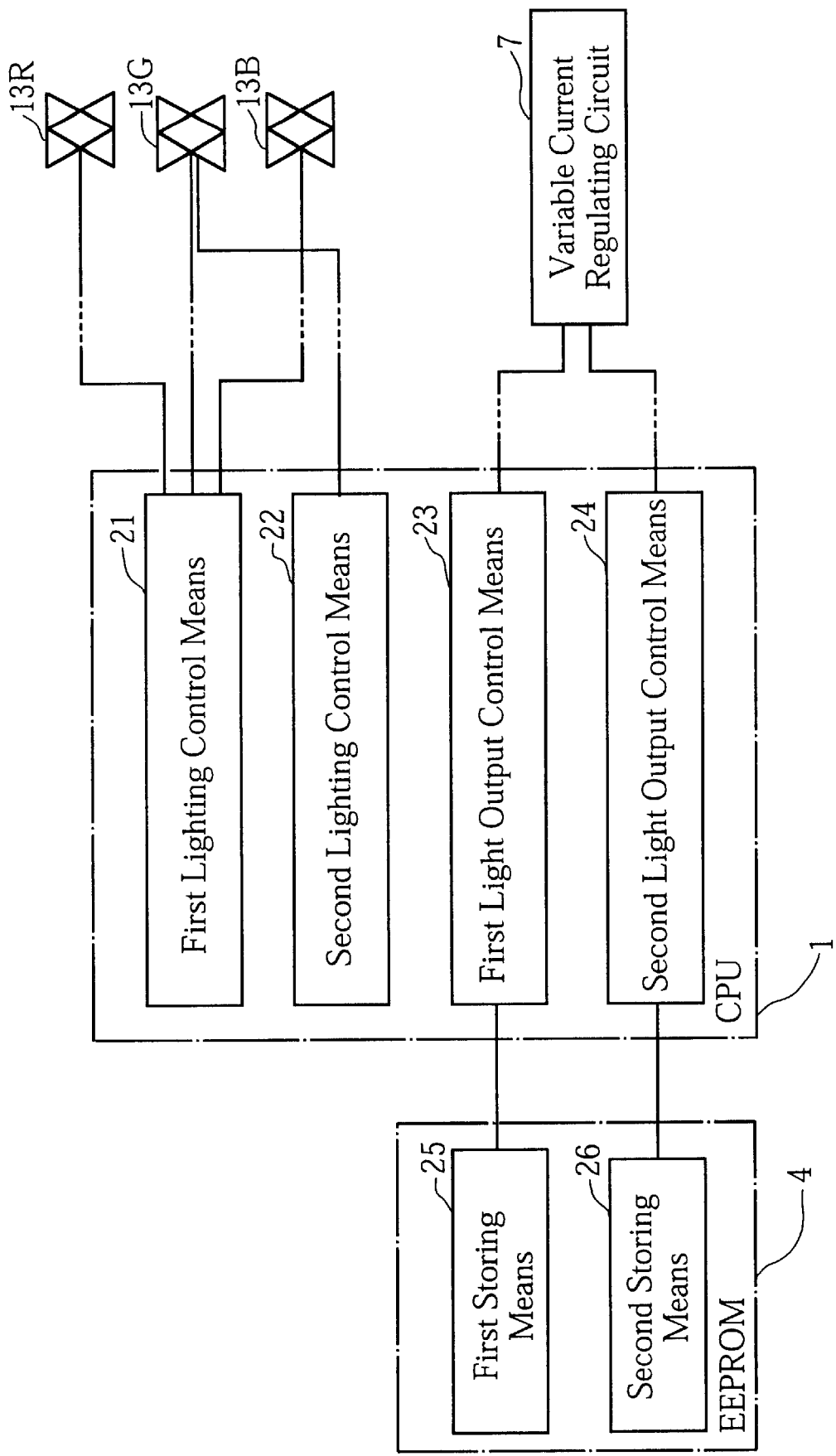
FIG. 2 is a block diagram illustrating the functions performed by a CPU incorporated in the color image reading apparatus shown in FIG. 1.

The CPU 1 operates on the programs stored in the ROM 3 for working as a first lighting controller 21, a second lighting controller 22, a first light output controller 23, and a second light output controller 24, as shown in FIG. 2. The EEPROM 4 is provided by a single semiconductor chip and serves as a first storage device 25 and a second storage device 26.

For full-color reading, the first lighting controller 21 controls the analog switches 13R, 13G, 13B for successively turning on the light emitting diodes 11R, 11G, 11B each for a predetermined period.

For monochrome reading, the second lighting controller 22 controls the analog switches 13R, 13G, 13B for continuously turning on the green light emitting diode 11G of the light emitting diodes 11R, 11G, 11B.

In full-color reading, the first light output controller 23 controls the variable current regulating circuit 7 according to first reference data from the first storage device 25 in synchronism with the first lighting controller 21 for setting the light output of each light emitting diode 11R, 11G, 11B to a first predetermined level.

In monochrome reading, the second light output controller 24 controls the variable current regulating circuit 7 according to second reference data from the second storage device 26 for setting the light output of the green light emitting diode 11G, which is turned on continuously by the second lighting controller 22, to a second predetermined level less than the first predetermined level.

Figure 3:
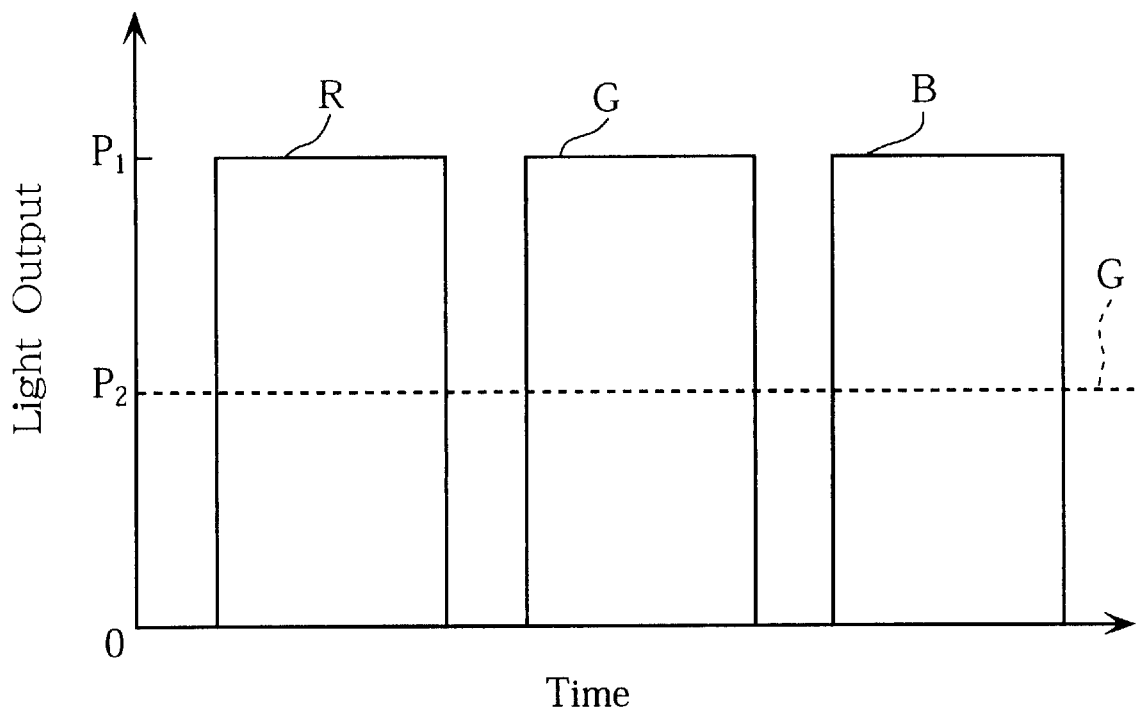
FIG. 3 shows the light outputs of light emitting diodes incorporated in the color image reading apparatus shown in FIG. 1.
Figure 4:
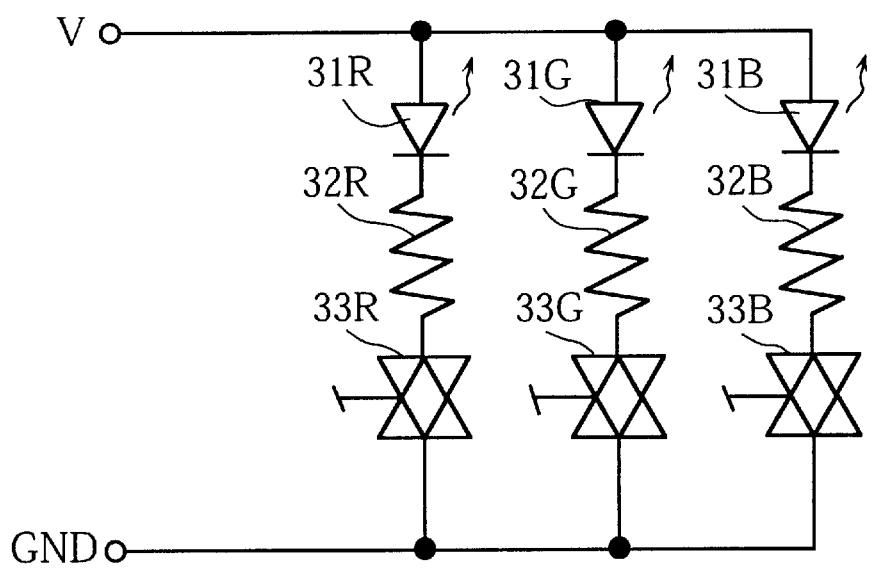
FIG. 4 is a circuit diagram showing a reading light source of a prior art color image reading apparatus.

In full-color reading, the light emitting diodes 11R, 11G, 11B, are turned on successively for a predetermined period, respectively, as shown by solid lines in FIG. 3. The red, green and blue light emitted from the light emitting diodes 11R, 11G, 11B, respectively, is directed to the surface of an object (not shown), such as a document, being scanned. The light reflected from the object surface is focused at a plurality of photoelectric elements (not shown) of a contact-type image sensor by a self-focusing lens (not shown) for example. The plurality of photoelectric elements provide image signals for each color in accordance with the image carried on the object. In FIG. 3, the abscissa represents time, whereas the ordinate represents light output.

More specifically, the CPU 1 controls the on-off states of the analog switches 13R, 13G, 13B, whereby the light emitting diodes 11R, 11G, 11B are successively turned on. At this time, the CPU 1 extracts the first reference data stored in the EEPROM 4 in synchronism with the on-off control of the analog switches 13R, 13G, 13B, whereby the first reference data are supplied as control signals to the variable current regulating circuit 7 through the D/A converter 6.

Therefore, when the light emitting diode 11R is turned on, the variable current regulating circuit 7 supplies the red light emitting diode 11R with a current corresponding to the first reference data for the red color. When the light emitting diode 11G is turned on, the variable current regulating circuit 7 supplies the green light emitting diode 11G with a current corresponding to the first reference data for the green color. When the light emitting diode 11B is turned on, the variable current regulating circuit 7 supplies the blue light emitting diode 11B with a current corresponding to the first reference data for the blue color.

As a result, the amount of light emitted from each light emitting diode 11R, 11G, 11B is adjusted to the same predetermined level regardless of the characteristics fluctuations between the light emitting diodes 11R, 11G, 11B even if these diodes 11R, 11G, 11B are turned on for the same period of time which is set beforehand. The amount of emitted light as referred to herein is calculated as the light output integrated with respect to the emission time. The CPU 1 monitors an operation signal from the operation unit 8 for determining which of the color mode and the monochrome mode is selected, and for causing the EEPROM 4 to store the monitored operation mode.

The operation described above is repeated for every line on the object as the object advances along the secondary scanning direction, thereby reading the image of the object.

In monochrome reading, the light emitting diode 11G is turned on continuously for irradiating the surface of the object with green light, as indicated by broken lines in FIG. 3. The reflected light is focused, through a self-focusing lens for example, at the light receiving surfaces of the plural photoelectric elements of a contact-type image sensor. The plural photoelectric elements generate image signals in accordance with the image on the object.

More specifically, the CPU 1 turns on the analog switch 13G while turning off the analog switches 13R, 13B, whereby the light emitting diode 11G is turned on continuously. At this time, the CPU 1 extracts the second reference data from the EEPROM 4 and supplies them as a control signal to the variable current regulating circuit 7 through the D/A converter 6. Therefore, when the light emitting diode 11G is turned on, the variable current regulating circuit 7 supplies the green light emitting diode 11G with a current according to the second reference data so that the green light emitting diode 11G is turned on continuously with a light output less than that for the full-color reading.

The current to the light emitting diode 11G is 15~20 mA for the monochrome reading for example, as opposed to 30 mA for the full-color reading. Therefore, the life of the light emitting diode 11G may be prolonged more than is possible where the light emitting diode 11G is turned on intermittently with a 30 mA current.

The first and the second reference data may be stored in the EEPROM 4 before shipment of the color image reading apparatus from the factory. For storage in the EEPROM 4, appropriate values for these reference data are so selected as to compensate for the characteristics fluctuations between the products of light emitting diodes 11R, 11G, 11B by measurement of each individual color image reading apparatus.

For example, each of the light emitting diodes 11R, 11G, 11B is measured for determining a current which is capable of generating a predetermined amount of light in a given period of time before storing the corresponding first reference data in the EEPROM 4. Further, the green light emitting diode 11G is measured for determining a current which is capable of generating a predetermined amount of light in a given period of time before storing the corresponding second reference data in the EEPROM 4. Such measurement is carried out with respect to each individual color image reading apparatus.

In this way, since the first light output controller 23 adjusts the light output of each color light emitting diode 11R, 11G, 11B to a predetermined level, the on-period may be equalized for all of the light emitting diodes 11R, 11G, 11B regardless of the product-to-product characteristics fluctuations, thereby eliminating hindrances against high-speed reading. In addition, it is also possible to prevent a subtle deterioration of the reading quality which might result from a on-period difference between the light emitting diodes 11R, 11G, 11B.

Specifically, since a higher current is supplied to a lower output one of the light emitting diodes 11R, 11G, 11B to increase its light output, its on-period does not need to be extended for obtaining the predetermined amount of light. Therefore, the length of the on-period does not impose any limitations on the reading speed. In addition, since the adjustment of the current for each color equalizes the light emission time for the respective color, the object may be advanced in the secondary scanning direction in a constant time for every color. Therefore, a subtle deterioration of the reading quality can be avoided.

Further, the life of the green light emitting diode 11G, which is used in monochrome reading, may be extended as much as possible because, in monochrome reading, the second light output controller 24 controls the light output of the green light emitting diode 11G, which is turned on continuously by the second lighting controller 22, to the second predetermined level less than the first predetermined level.

More specifically, since the light emitting diode 11G is turned on continuously with a smaller light output in monochrome reading, its life may be extended in comparison with the case where the light emitting diode 11G is turned on intermittently by the same current as that in full-color reading. In addition, the continuous turn-on control is easier than the intermittent turn-on control.

Further, compared with the provision of a variable current regulating circuit separately for each color, the manufacturing cost may be reduced due to the provision of the single variable current regulating circuit 7 for controlling the current commonly for the light emitting diodes 11R, 11G, 11B of the respective colors.

Moreover, the selection of the green light emitting diode 11G for monochrome reading allows an image on the object to be read clearly because the optical system of a color image reading apparatus is normally designed to focus green light accurately at the light receiving surfaces of the photoelectric elements.

Further, the provision of the single light emitting diode for each color costs less than providing a plurality of light emitting diodes for each color.

Still further, since the first and the second reference data are stored in the EEPROM 4, they are retained even if the power supply is turned off, as opposed to using a RAM which requires a backup power source.

What is claimed is:

1. A color image reading apparatus comprising:
   a first lighting controller which, in full-color reading, successively turns on a red light emitting diode, a green light emitting diode and a blue light emitting diode as reading light sources each for a predetermined period;
   a variable current regulating circuit for supplying current to the light emitting diodes;
   a first light output controller combined with the current regulating circuit for setting light output of each light emitting diode, which is turned on by the first lighting controller, to a first predetermined level in full-color reading;
   a second lighting controller for continuously turning on one of the light emitting diodes in monochrome reading; and
   a second light output controller combined with the current regulating circuit for setting, in monochrome reading, light output of said one light emitting diode, which is turned on continuously by the second lighting controller, to a second predetermined level less than the first predetermined level.

2. The color image reading apparatus according to claim 1, wherein the second lighting controller turns on the green light emitting diode, the second light output controller setting the light output of the green light emitting diode to the second predetermined level.

3. The color image reading apparatus according to claim 1, wherein a single light emitting diode is provided for each color.

4. A color image reading apparatus comprising:
   red, green and blue light emitting diodes provided, in any number for each color, as reading light sources;
   a variable current regulating circuit for supplying current to the light emitting diodes;
   a switch circuit for turning on and off each light emitting diode;
   a first lighting controller which controls the switch circuit for turning on the light emitting diodes, successively with respect to the colors, for a predetermined period in full-color reading;
   a first light output controller which, in full-color reading, controls the variable current regulating circuit in synchronism with the first lighting controller according to first reference data stored beforehand in a first storage device for setting the light output of each light emitting diode to a first predetermined level;
   a second lighting controller which controls the switch circuit for continuously turning on a selected color of the light emitting diodes in monochrome reading;
   a second light output controller which, in monochrome reading, controls the variable current regulating circuit according to second reference data stored beforehand in a second storage device for setting the light output of the selected light emitting diode, which is continuously turned on by the second lighting controller, to a second predetermined level less than the first predetermined level.

5. The color image reading apparatus according to claim 4, wherein the switch circuit comprises analog switches.

6. The color image reading apparatus according to claim 4, wherein the first storage device comprises an electrically erasable non-volatile memory.

7. The color image reading apparatus according to claim 4, wherein the second storage device comprises an electrically erasable non-volatile memory.

8. The color image reading apparatus according to claim 4, wherein the first storage device and the second storage device are incorporated on a single semiconductor chip which provides an electrically erasable non-volatile memory.

* * * * *